US 6,747,237 B2

(12) United States Patent
Arakawa

(10) Patent No.: US 6,747,237 B2
(45) Date of Patent: Jun. 8, 2004

(54) METHOD OF AND DEVICE FOR ADJUSTING PERPENDICULARITY OF WIRE OF WIRE-CUT ELECTRIC DISCHARGE MACHINE

(75) Inventor: Yasuo Arakawa, Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 10/230,307

(22) Filed: Aug. 29, 2002

(65) Prior Publication Data

US 2003/0042228 A1 Mar. 6, 2003

(30) Foreign Application Priority Data

Aug. 30, 2001 (JP) .......................... 2001/261438

(51) Int. Cl.[7] ................................. B23H 7/02
(52) U.S. Cl. .................................... 219/69.12
(58) Field of Search ................ 219/69.12, 69.17

(56) References Cited

U.S. PATENT DOCUMENTS

| | | | | |
|---|---|---|---|---|
| 4,777,340 A | * | 10/1988 | Kobayashi et al. | 219/69.12 |
| 4,931,614 A | * | 6/1990 | Sumita | 219/69.12 |
| 5,003,147 A | * | 3/1991 | Kawanabe et al. | 219/69.12 |
| 6,612,043 B2 | * | 9/2003 | Tsai et al. | 33/502 |

FOREIGN PATENT DOCUMENTS

| | | | | |
|---|---|---|---|---|
| JP | 63-139617 A | * | 6/1988 | |
| JP | 1-246019 A | * | 10/1989 | 219/69.12 |
| JP | 3-35941 A | * | 2/1991 | |
| JP | 11-221720 A | * | 8/1999 | |

* cited by examiner

*Primary Examiner*—Geoffrey S. Evans
(74) *Attorney, Agent, or Firm*—Staas & Halsey LLP

(57) ABSTRACT

A method of and a device for adjusting perpendicularity of a wire of a wire-cut electric discharge machine for performing a precise electric discharge machining with low cost. The wire is inclined in a U-axis direction to enable the wire to come into contact with only a lower contact piece of an adjusting jig. The wire is held at fixed positions with no play at an upper wire guide and the lower wire guide in this inclined state. The adjusting jig is move in the Y-axis direction to bring the wire into contact with only the lower wire guide and a position Y1 of the contact is stored. The adjusting jig is move in the X-axis direction to enable the wire to come into contact with only the upper contact piece, and the adjusting jig is move in the Y-axis direction to bring the wire into contact with the upper wire guide and a position Y2 of the contact is stored. A displacement of the upper wire guide in the V-axis direction is obtained based on a difference $\Delta Y$ between the contact positions Y1 and Y2 and a distance D between the two contact pieces and a difference H between the upper and the lower wire guides, to compensate the displacement of the upper guide according to the displacement amount. The above procedure is repeatedly performed until the difference $\Delta Y$ is within an allowable range. An adjustment of perpendicularity of the wire in the U-axis direction is performed in the similar manner.

23 Claims, 10 Drawing Sheets

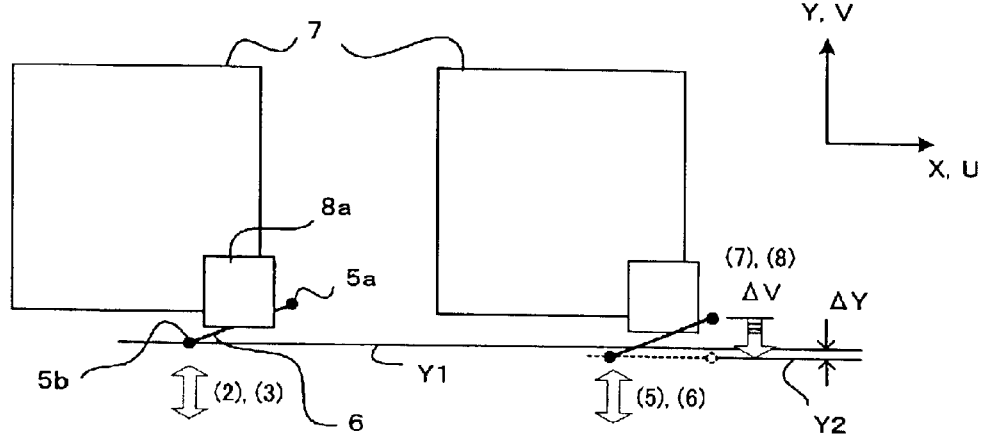
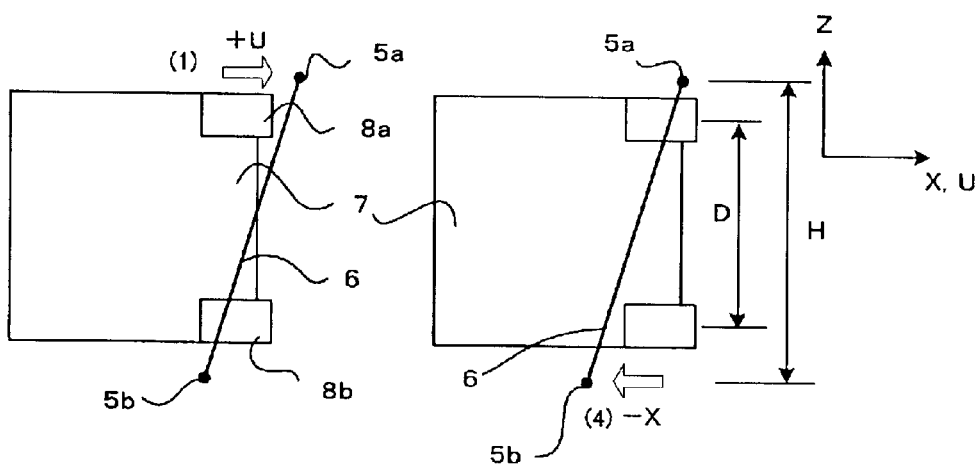

METHOD OF AND DEVICE FOR ADJUSTING PERPENDICULARITY OF WIRE OF WIRE-CUT ELECTRIC DISCHARGE MACHINE

BACKGROUND OF THE INVENTION

1. Field of the Invention

The present invention relates to a wire-cut electric discharge machine and in particular to a method of and a device for adjusting perpendicularity of a wire with respect to a reference plane on which a workpiece is mounted.

2. Description of Related Art

The wire-cut electric discharge machine performs electric discharge machining by feeding a wire to extend between a pair of wire guides and exerting an electric voltage between the wire and a workpiece arranged between the pair of wire guides. There are known wire-cut electric discharge machines of a vertical type and a horizontal type. In the vertical-type wire-cut electric discharge machine, as shown in FIG. 12, an upper wire guide 5a and a lower wire guide 5b are arranged vertically (in a Z-axis direction) for guiding a wire 6 to extend therebetween. A workpiece mounting table 4 for mounting a workpiece W is arranged between the upper guide 5a and the lower guide 5b. The mounting table 4 is driven in a X-axis direction and a Y-axis direction perpendicular to each other on a horizontal plane. The mounting table 4 has a Y-axis unit 4y arranged on a base 1 and driven in the Y-axis direction by a Y-axis servomotor My and a X-axis unit 4x arranged on the Y-axis unit 4y and driven in the X-axis direction by an X-axis servomotor Mx. A workpiece W is mounted on a workpiece mounting member 4c fixed on the X-axis unit 4x. The electric discharge machining is performed by exerting a machining voltage between the wire 6 and the workpiece W while moving the workpiece W mounted on the mounting table 4 by driving the X-axis servomotor Mx and the Y-axis servomotor My. Further, one of the wire guides 5a and 5b is arranged movable in directions of two rectangular axes for performing a tapered machining, etc. on the workpiece W.

In the example of FIG. 12, the lower wire guide 5b is fixed at a distal end of a horizontal beam 3 extending from a column 2 provided vertically on the base, and the upper wire guide 5a is arranged on a horizontal beam (not shown) extending from the column 2 and driven in directions of a U-axis and a V-axis perpendicular to each other by a U-axis servomotor and a V-axis servomotor (not shown), respectively. It is usual that the U-axis is arranged parallel to the X-axis and the U-axis is arranged parallel to the Y-axis. In the following description, a plane defined by the X-axis and the Y-axis is referred to as a reference plane.

In the horizontal type wire-cut electric discharge machine, as shown in FIG. 13, a pair of heft-hand and right-hand wire guides 5L and 5R are arranged horizontally (in a Z-axis direction) and a wire 6 is arranged to extend between the heft-hand wire guide 5L and the right-hand wire guide 5R. A workpiece mounting table 4 for mounting a workpiece W thereon is arranged between the light-hand wire guide 5L and the right-hand wire guide 5R. The electric discharge machining is performed by exerting a machining voltage between the wire 6 and the workpiece W while moving the workpiece W on a vertical reference plane in the X-axis direction and the Y-axis direction by driving the X-axis servomotor and the Y-axis servomotor (not shown).

Further, in FIG. 13, in order to perform a tapered machining, etc,, one of the wire guides 5L and 5R has driving means for driving the wire guide in directions of two rectangular axes (usually parallel to the X-axis and the Y-axis, respectively) on a plane parallel to the vertical reference plane. In the example of FIG. 13, the left-hand wire guide 5L is driven in U-axis and V-axis directions respectively parallel to the X-axis and the Y-axis by the U-axis and V-axis servomotors (not shown).

In the above described wire-cut electric discharge machines having means for driving one of the wire guides in directions of two rectangular axes, it is necessary to obtain positions of the wire guides in a U–V coordinate system for guiding the wire 6 to extend precisely perpendicular to the reference plane.

There is known, from Japanese Patent No. 2698664, a device for adjusting perpendicularity of the wire by controlling a direction of the wire so that the wire is brought into contact with a pair of contact pieces, which are arranged in a direction perpendicular to the reference plane, simultaneously and at the same positions on the pair of contact pieces.

Further, there is disclosed, in Japanese Patent No. 2752550, an apparatus for obtaining an angle of the wire based on a displacement of positions of the wire respectively in contact with a pair of contact pieces arranged to be horizontally and vertically displaced on a vertical plane.

As the wire guide for guiding the wire, a dice-like guide which has a though hole forming a gap of 5 μm–20 μm between an inner circumference thereof and an outer circumference of the wire is generally used. Specifically, as shown in FIG. 1, a gap α of 5 μm–20 μm is formed between an inner circumference of the through hole of the wire guides 5 and the outer circumference of the wire 6. Therefore, when the wire 6 extending between the pair of wire guides aligned to be perpendicular to the reference plane is brought into contact with the contact piece, the wire moves in a range of the gap in the through hole to make an error in adjusting the perpendicularity of the wire. Thus, a precision of the adjustment can not be improved to a degree less than the gap α in the wire guide according to the above methods in which the wire extending between the wire guides aligned to be perpendicular to the reference plane is brought into contact with the contact piece for compensating an error of perpendicularity of the wire based on the contact positions of the wire with the contact piece.

Further, the method in which the wire is simultaneously brought into contact with the pair of contact pieces has a problem in that detection means such as a detection circuits for detecting a contact between the wire and the contact piece is necessary for each of the pair of contact pieces.

SUMMARY OF THE INVENTION

An object of the present invention is to provide a method of and a device for adjusting perpendicularity of a wire of a wire-cut electric discharge machine capable of performing higher precision machining with low cost.

A method of adjusting perpendicularity of a wire of the present invention is applicable to a wire-cut electric discharge machine of the present invention having a driving mechanism for driving a workpiece mounting table in direction of two rectangular axes defining a reference plane, a pair of wire guides for guiding a wire perpendicularly to the reference plane, a driving unit for driving one of the wire guides on a plane parallel to the reference plane. The method comprises the steps of:

(a) arranging an adjusting jig having at least one pair of contact pieces spaced apart from each other on a reference perpendicular plane perpendicular to the reference plane, on the workpiece mounting table;

(b) moving said one of the wire guide so that the wire is inclined in a direction other than a direction perpendicular to the reference perpendicular plane to enable the wire to come into contact with only one of the pair of contact pieces;

(c) moving the adjusting jig so that the wire comes in contact with only said one of the pair of contact pieces and obtaining a first contact position of the wire in contact with said one of the pair of contact pieces;

(d) moving the adjusting jig to enable the wire to come into contact with the other of the pair of the contact pieces;

(e) moving the adjusting jig so that the wire comes into contact with only the other of the pair of contact pieces and obtain a second contact position of the wire in contact with the other of the pair of contact pieces;

(f) obtaining a displacement amount of said one of the wire guides with respect to the reference perpendicular plane based on a difference between the first contact position and the second contact position;

(g) moving said one of the wire guides in a direction to compensate the obtained displacement amount to adjust perpendicularity of the wire on a plane parallel to the reference perpendicular plane;

(h) performing the steps (b)–(g) with respect to another reference perpendicular plane perpendicular to the reference plane to adjust perpendicularity of the wire on a plane parallel to said another reference perpendicular plane.

The steps (b)–(g) may be repeatedly performed until the difference between the first contact position and the second contact position is not greater than a predetermined value or the displacement amount of said one of the wire guides is not greater than a predetermined amount.

The wire may be inclined on a plane parallel to the reference perpendicular plane in the step (b).

The reference perpendicular plane may be parallel to one of the two rectangular axes of the driving mechanism for driving the workpiece mounting table.

The driving unit may drive said one of the wire guides in two directions respectively parallel to the two rectangular axes of the driving mechanism for driving the workpiece mounting table.

The contact piece of the adjusting jig may have a portion in the form of a plane, a generatrix line of a cylinder or a semi-cylinder, or a ridge line for contact wit the wire, and lines respectively connecting points of contact of the pair of contact pieces with the wire are parallel to each other or extensions of the lines intersect with each other at an acute angle.

The contact between the wire and the adjusting jig may be detected by a workpiece end face detection circuit for detecting a contact between the wire and a workpiece.

The adjusting jig may be made of electrically conductive material to equalize electric potential at whole portions thereof.

A positional error of the pair of contact pieces of the adjusting jig with respect to the reference perpendicular plane may be measured and stored in advance and the displacement amount of said one of the wire guides may be compensated using the stored positional error.

The adjusting jig may be made of electrically conductive material having corrosion resistance against machining fluid.

A block having side faces perpendicular to the reference plane when mounted on the workpiece mounting table may be used as the adjusting jig. In this case, an upper portion and a lower portion of the block are used as the pair of contact pieces.

The present invention also provides a device for carrying out the above method of adjusting perpendicularity of a wire of a wire-cut electric discharge machine.

BRIEF DESCRIPTION OF THE DRAWINGS

FIGS. 3a–3d are schematic views illustrating a method of adjusting perpendicularity of the wire according to the present invention;

DETAILED DESCRIPTION OF THE PREFERRED EMBODIMENTS

Figure 1:
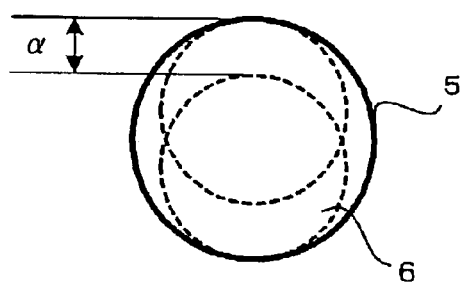
FIG. 1 is a schematic view showing relationship between a wire and a through hole of a wire guide.

As described referring to FIG. 1, there is a gap $\alpha$ between an inner circumference of a through hole of a wire guide 5 and an outer circumference of a wire 6. When the wire 6 extending between the wire guides aligned to be perpendicular to a reference plane is brought into contact with the contact piece, the wire 6 moves in a range of the gap $\alpha$ in the through hole to make an error in adjustment of perpendicularity of the wire.

Figures 2A, 2B:
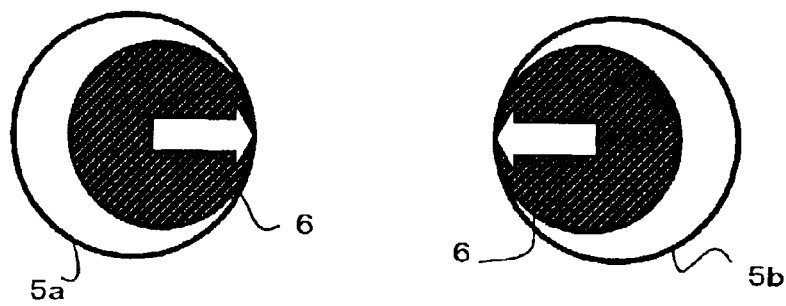
FIGS. 2a and 2b are schematic views showing relationship between the wire and the through holes of the wire guides when the wire is inclined.
Figure 12:
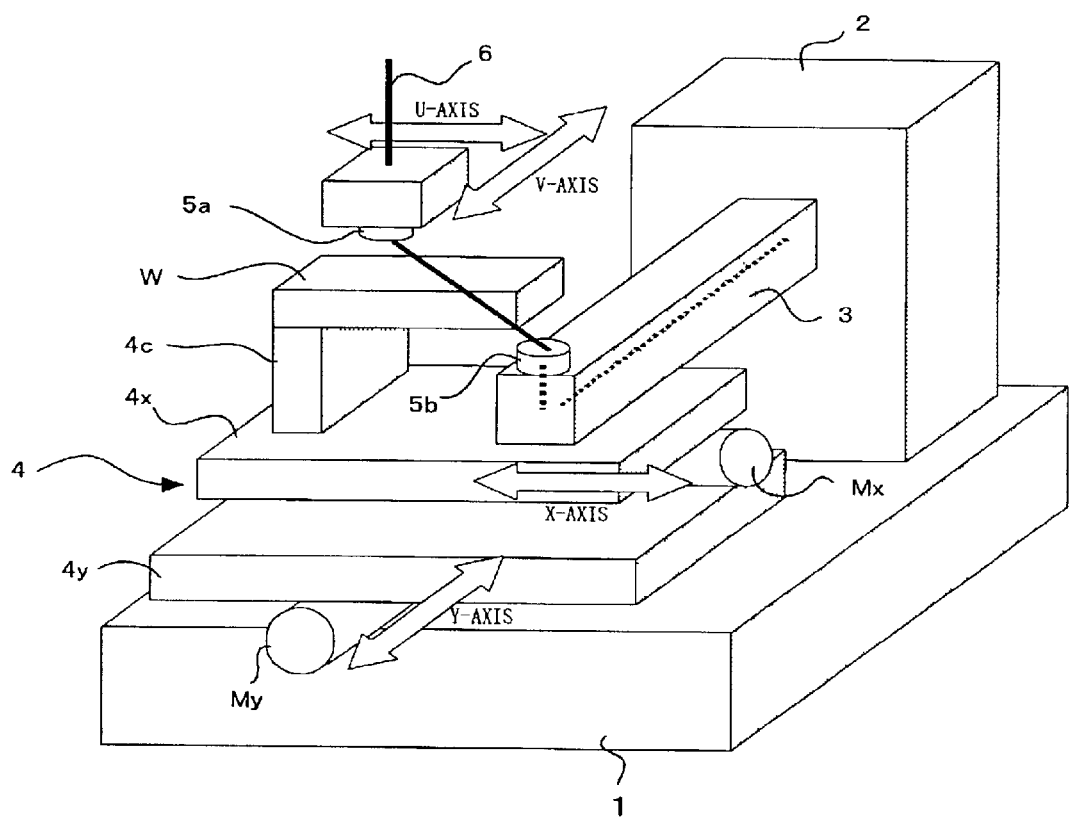
FIG. 12 is a schematic view of a vertical-type wire-cut electric discharge machine.
Figure 13:
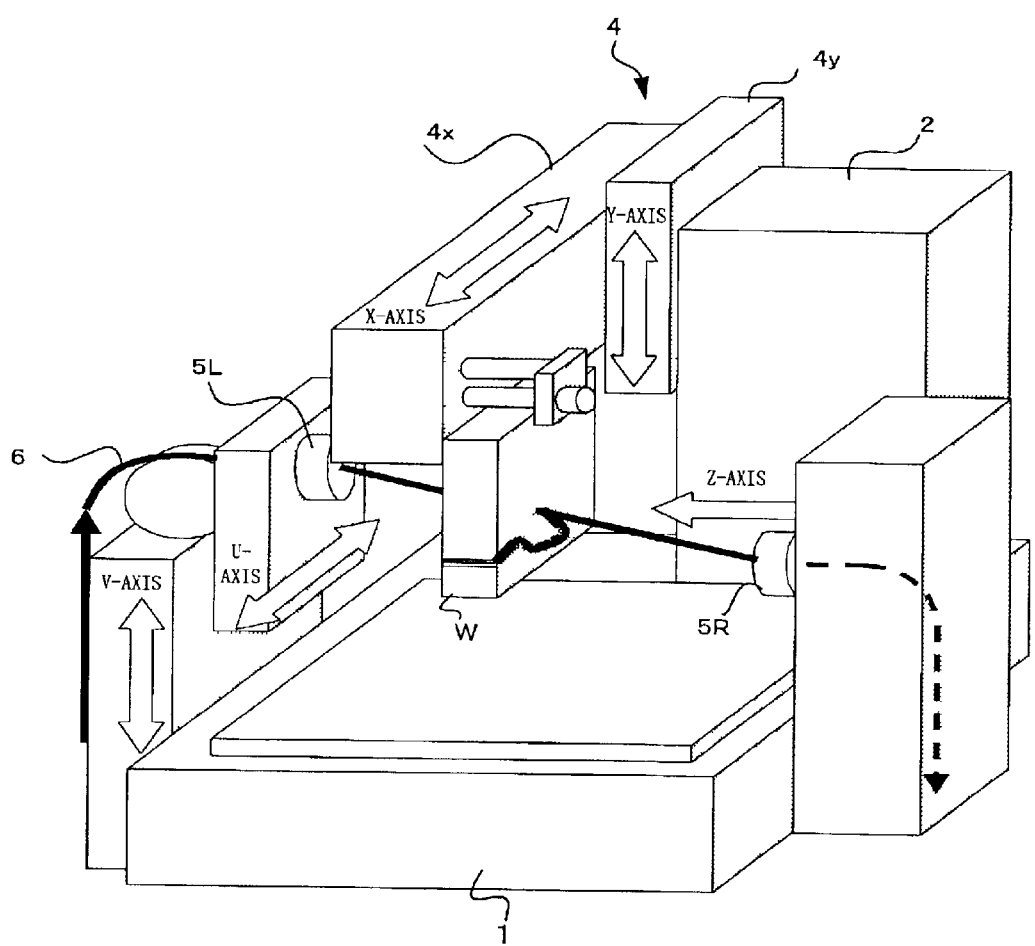
FIG. 13 is a schematic view of a horizontal-type wire-cut electric discharge machine.

However, when the wire 6 is inclined in one direction, a position of the wire 6 is fixed in the wire guide 5. For example, when the wire 6 is inclined to a direction to extend from left-hand to right-hand between the upper wire guide 5a and the lower wire guide 5b in the vertical-type wire-cut electric discharge machine as shown in FIG. 12, the wire 6 abuts and fixed on the inner circumference of the through hole of the upper wire guide 5a at a position where a straight line extending on a center of the through hole in the inclined direction intersects the inner circumference of the through hole, as shown in FIG. 2a. Similarly, the wire 6 abuts and fixed on the inner circumference of the through hole of the lower wire guide 5b at a position where a straight line extending on a center of the through hole in the inclined direction intersects the inner circumference of the through hole, as shown in FIG. 2b. In this state, when the wire 6 is brought into contact with the contact piece, the wire 6 does not move in the wire guides 5a and 5b, so that a position of the wire 6 in contact with the contact piece is precisely detected. The present invention utilize this effect of positional relationship between the wire 6 and the wire guides 5a and 5b for the adjustment of perpendicularity of the wire.

FIGS. 3a–3d shows a procedure of the method of adjusting perpendicularity of the wire according to the present invention based on the vertical-type wire-cut electric discharge machine as shown in FIG. 12.

FIGS. 3a and 3b are plan views and FIGS. 3c and 3d are elevation views showing relationship between the wire 6 and an adjusting jig 7 for adjusting perpendicularity of the wire 6. Although the adjusting jig 7 is actually moved with respect to the wire 6, the description is made assuming that the wire 6 is moved relatively to the adjusting jig 7 in the X-axis and Y-axis directions.

The adjusting jig 7 is in the form of a cube and has contact pieces 8a and 8b at an upper corner and a lower corner, respectively. Front faces of the contact pieces 8a and 8b defines a first reference perpendicular plane perpendicular to the reference plane defined by the X-axis and the Y-axis, and side faces of the contact pieces 8a and 8b defines a second reference perpendicular plane perpendicular to the reference plane when adjusting jig 7 is mounted on the workpiece mounting table 4. In this example, the first and second reference perpendicular planes are parallel to each other, and the adjusting jig 7 is mounted on the workpiece mounting table 4 so that the first reference perpendicular planes is parallel to the X-Z plane and the second reference perpendicular plane is parallel to the Y-Z plane of the X-Y-Z rectangular coordinate system. Further, in this example, the U-axis is parallel to X-axis and the V-axis is parallel to the Y-axis.

(1) First, the wire 6 is inclined by a predetermined degree in a direction other than a direction perpendicular to the first reference perpendicular plane such that the wire is able to be brought into contact with only one of the contact pieces 8a and 8b. In this example, the wire 6 is inclined in a direction parallel to the first reference perpendicular plane such that the wire 6 can be brought into contact with only one of the contact pieces 8a and 8b, as shown in FIG. 3c. It is optimal that the wire 6 is inclined in the direction parallel to the first reference perpendicular plane in view of making the wire 6 suitable for being brought into contact with only one of the contact pieces 8a and 8b. Since the first reference perpendicular plane is set parallel to the X-Z plane, the upper wire guide 5a is moved in positive direction, in this example, of the U-axis.

(2) The adjusting jig 7 is moved in a negative direction of the Y-axis (the wire 6 is moved in a positive direction of the Y-axis) to bring the wire 6 into contact with only the lower contact piece 8b by driving the Y-axis servomotor, as shown in FIG. 3a, and a position (X1, Y1) of the wire 6 in contact with the lower contact piece 8b is stored. In this example, since the wire 6 is moved relatively to the adjusting jig 7 only in the Y-axis direction, only the coordinate value Y1 of the Y-axis is stored.

(3) The adjusting jig 7 is moved in the positive direction of the Y-axis (the wire 6 is moved in the negative direction of the Y-axis) to bring the wire 6 out of contact with the lower contact piece 8b.

(4) The adjusting jig 7 is moved in the positive direction, in this example, of the X-axis (the wire 6 is moved in the negative direction of the X-axis) to a position where the wire 6 is able to be in contact with only the upper contact piece 8a.

(5) The adjusting jig 7 is moved in a negative direction of the Y-axis (the wire 6 is moved in the positive direction of the Y-axis) to bring the wire 6 into contact with only the upper contact piece 8a, as shown in FIG. 3b, and a position (X2, Y2) of the wire 6 in contact with the upper contact piece 8a is stored. In this example, since the wire 6 is moved relative to the adjusting jig 7 only in the Y-axis direction, only the coordinate value Y2 of the Y-axis is stored.

(6) The adjusting jig 7 is moved in the positive direction of the Y-axis (the wire 6 is moved in the negative direction of the Y-axis) to bring the wire 6 out of contact with the upper contact piece 8a.

(7) An error $\Delta Y$ ($=Y1-Y2$) between the contact positions Y1 and Y2 of the Y-axis is obtained, and if the error $\Delta Y$ is not within a predetermined allowable range, a displacement amount $\Delta V$ of the upper wire guide 5a is obtained according to the following equation (1) using the error $\Delta Y$, a distance D between the upper contact piece 8a and the lower contact piece 8b and a distance H between the upper guide 5a and the lower guide 5b.

$$\Delta V = (Y1-Y2) \times H/D \qquad (1)$$

If there is an error $\beta$ between a plane defined by the faces of the contact pieces and the reference perpendicular plane, as described later, the above displacement amount $\Delta V$ is obtained according to the following equation (2).

$$\Delta V = (Y1-Y2-\beta) \times H/D \qquad (2)$$

(8) The upper wire guide 5a is moved in the V-axis direction by the displacement amount $\Delta V$ to compensate the displacement in the V-axis direction.

(9) The above steps (1)–(8) are repeatedly executed until the error $\Delta Y$ is within the allowable range, which is usually set to 1 $\mu$m, or until the displacement amount $\Delta V$ is within an allowable range.

Thus, the adjustment of perpendicularity of the wire 6 in the V-axis direction is completed. In the same manner, the adjustment of perpendicularity of the wire 6 in the U-axis direction is performed. The second reference perpendicular plane parallel to the Y-Z plane is used for the adjustment of perpendicularity of the wire 6 in the U-axis direction. The upper wire guide 5a is moved in the V-axis direction for inclining the wire 6 on a plane parallel to the second reference perpendicular plane. The adjusting jig 7 is moved in the X-axis direction for bringing the wire into contact with the contact pieces 8a and 8b to obtain contact positions X1 and X2 in the X-axis direction. A displacement amount $\Delta U$ is obtained using the error $\Delta X$ between the contact positions X1 and X2, the distance D and the distance H.

Figure 4:
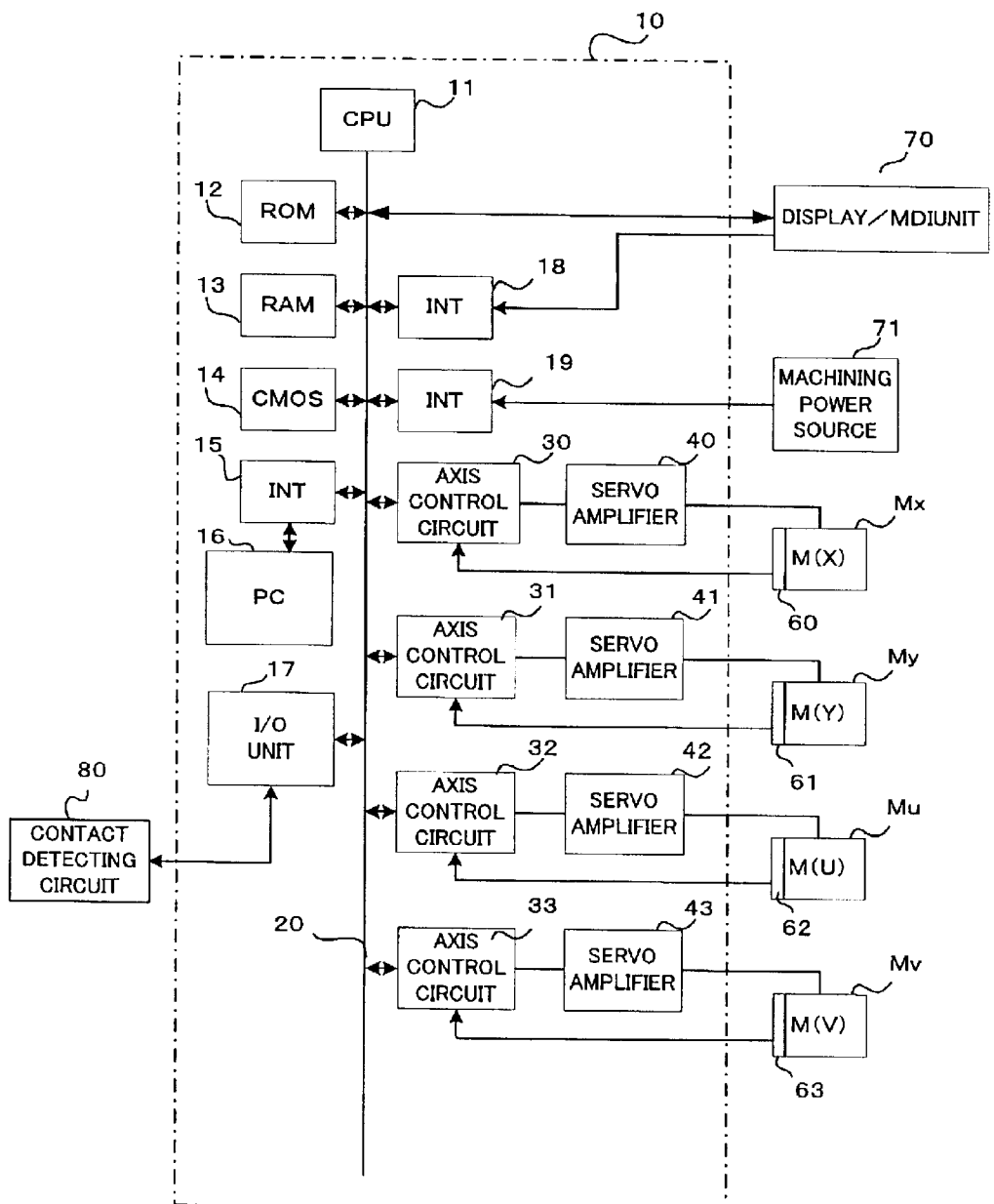
FIG. 4 is a block diagram of a controller of a wire-cut electric discharge machine according to the present invention.

FIG. 4 shows a principal part of a numerical controller as a controller for controlling a wire-cut electric discharge machine according to an embodiment of the present invention.

As shown in FIG. 4, a processor 11 generally controls a numerical controller 10 according to a system program read from a ROM 12 through a bus 21. A RAM 13 temporarily stores calculation data, display data, etc. A CMOS memory 14 is backed up by a battery not shown to function as a nonvolatile memory for retaining stored data even when a power of the numerical controller 10 is turned off.

An interface 15 is connected with an external device such as a tape reader, a tape puncher and a flexible disc drive. A machining program is read from the external device and a machining program edited in the numerical controller 10 is outputted to the external device.

A PC (programmable controller) 16 controls the wire-cut electric discharge machine according to a sequence program. The PC 16 converts functional commands designated by the operational program commands into signals for the wire-cut electric discharge machine according to the sequence program and outputs the signals to the wire-cut electric discharge machine through the I/O unit 17. According to the present invention, particularly, a contact detecting circuit 8 is connected to the I/O unit 17.

Signals representing present positions of respective axes of the wire cut electric discharge machine, an alarm, various parameters, display data, etc. are sent to a display circuit in a display/MDI unit 70 and displayed on a display device of the display/MDI unit 70. An interface 18 receives data from a keyboard of the display/MDI unit 70 and transfer the data to the processor 11. An interface 19 is connected to a machining power source 71 for electric discharge and receives signals indicating a machining feed rate from the power source 71. The machining power source 71 monitors an electric discharge between the wire and the workpiece and issues commands for the machining feed rate including commands for forward and reverse motions to the processor 11.

Axes control circuits 30–33 receive motion commands for the respective axes from the processor 11 and output control signals to associated servo amplifiers 40–43. The servo amplifiers 40–43 drive respective servomotors Mx, My, Mu and Mv for the X-axis, Y-axis, U-axis and V-axis according to the control siganls. The servomotors Mx, My, Mu and Mv have pulse coders 60–63, respectively, for detecting positions/velocities of respective axes and signals representing the detected positions/velocities are fed back to the axis control circuits 30–33. A servo CPU build in each of the axis controllers 30–33 performs processing of a position loop, a velocity loop and a current loop to obtain a torque command for the associated axis based on the motion commands and the feedback signals to control position and velocity of the servomotor Mx, My, Mu and Mv.

Figure 5:
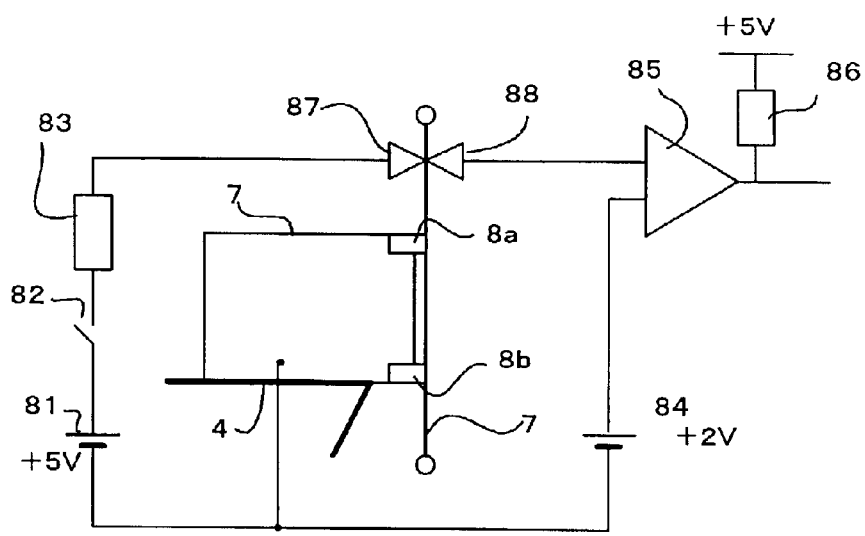
FIG. 5 is a detailed diagram of a contact detecting circuit in the controller shown in FIG. 4.
Figure 8:
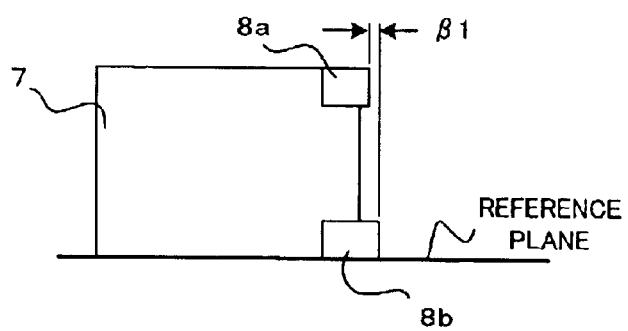
FIG. 8 is a side view of an adjusting jig showing an manufacturing error of the adjusting jig.

FIG. 5 shows an example of the contact detecting circuit 80. As shown in FIG. 8, one terminal of a power source 81 having a voltage of +5V is connected to the wire 6 through a switch 82, a resistor 83 and an electrode 87, and the other terminal of the power source 81 is connected to the adjusting jig 7 mounted on the workpiece mounting table 4 and connected to the ground. An electric potential of the wire 6 is inputted to one input terminal of a comparator 85 through an electrode 88, and an electric potential increased by a reference voltage of +2V of a power source 84 with respect to the electric potential of the adjustment jig 7 is inputted to the other input terminal of the comparator 85. A reference numeral 86 denotes a resistor.

Figure 6:
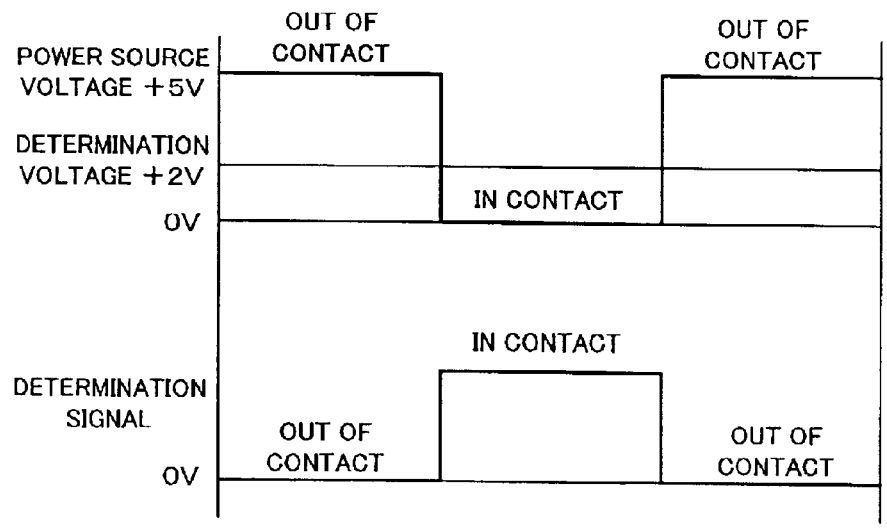
FIG. 6 is a diagram showing an operation of the contact detecting circuit.

FIG. 6 shows operational signals of the contact detecting circuit 80. A command for adjusting perpendicularity of the wire is outputted from the numerical controller 10, the switch 82 is turned ON. In a state where the wire 6 is out of contact with the contact piece 8a or 8b, the electric potential of the wire 6 taken out through the electrode 88 is +5V equal to the voltage of the power source 81 which is higher than +2V of the reference voltage of the power source 84, so that the output signal of the comparator 85 is of a L level. When the wire 6 comes into contact with one of the contact pieces 8a and 8b, the wire 6 is connected to the ground through the contact piece and the adjusting jig 7 so that the electric potential of the wire 6 is reduced to substantially zero. The electric potential of the wire 6 is inputted to the comparator 85 through the electrode 88 and compared with the reference voltage of +2V, to turn the determination signal of the comparator 85 to a H level. The processor 11 of the numerical controller 10 detect the contact between the wire 6 and the contact piece 8a or 8b based on the determination signal outputted form the comparator 85.

The above-described contact detecting circuit 80 may be provided by utilizing a workpiece end-face detecting circuit for detecting an end face of a workpiece based on a contact between the wire and the workpiece, which is ordinarily provided in a wire-cut electric discharge machine, and is not necessary to prepare additionally.

The processing for adjusting perpendicularity of the wire using the numerical controller 10 and the contact detecting circuit 80 will be described with respect to the vertical-type wire-cut electric discharge machine.

Figure 7:
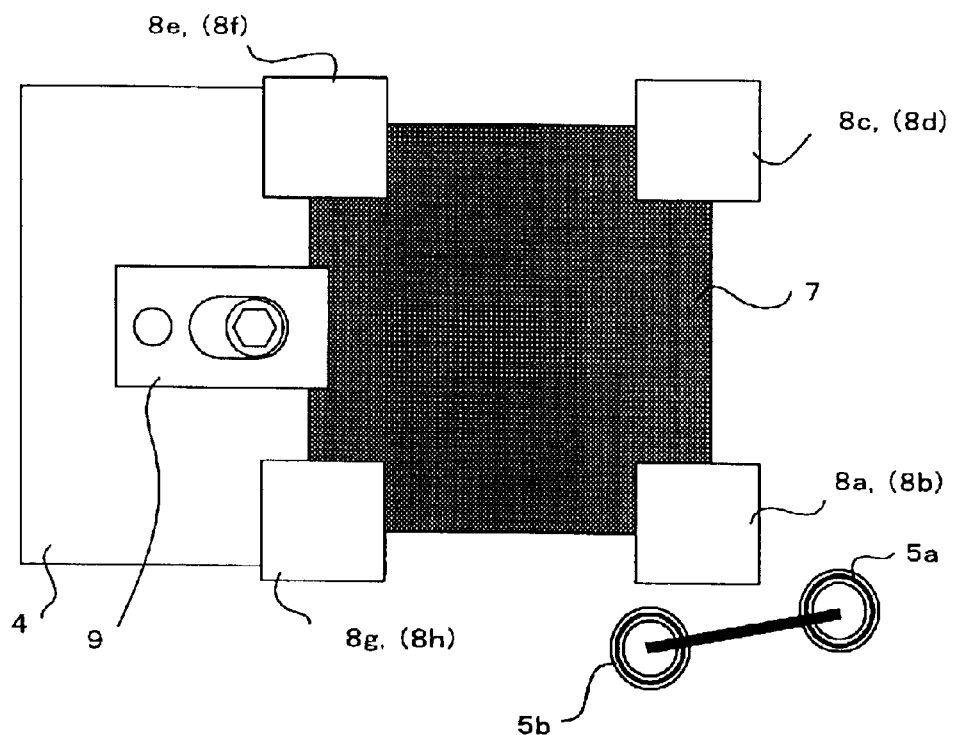
FIG. 7 is a plan view showing an example of an adjusting jig.

First, as shown in the plan view of FIG. 7, the adjusting jig 7 is mounted on the workpiece table 4 by a fixture 9. It is adequate that the adjusting jig 7 has one pair of contact pieces defining two vertical reference planes, as shown in FIGS. 3a–3d, however, it is desirable that the adjusting jig 7 has a plurality of pairs of contact pieces in view of an actual machining. The adjusting jig 7 shown in FIG. 7 is in the form of a cuboid and has four pairs of contact pieces 8a, 8b; 8c, 8d; 8e, 8f; and 8g, 8h at eight apexes of the cuboid. One pair or two pairs of contact pieces are used for the adjustment of perpendicularity of the wire. All the components of the adjusting jig 7 is made of electrically conductive material which has high corrosion resistance against machining fluid.

As described above, contacting faces of a pair of contact pieces (e.g., contact pieces 8a and 8b) define the vertical reference planes, however, there is a case where a plane on which the side faces of the contact pieces lies is not precisely perpendicular to the reference plane due to a manufacturing error, etc. of the adjusting jig 7. To cope with this problem, a displacement of the contacting faces of the contact pieces are measured and stored in the numerical controller 10.

FIG. 8 illustrates a dimensional error of the adjusting jig 7, i.e., the displacement of the contacting faces of the contact pieces 8a and 8b. The adjusting jig 7 is mounted on the workpiece mounting table 4 and an error β of the contacting faces of the contact piece 8a from the reference perpendicular plane precisely perpendicular to the reference plane is measured and inputted to the numerical controller 10. The error in the Y-axis direction is represented by β1 and the error in the X-axis direction is represented by β2. The error in the X-axis direction and the error in the Y-axis direction exist with respect to each pair of the contact pieces. Thus, the errors β1 and β2 are respectively measured and stored with respect to the contacting faces of a pair or pairs of the contact pieces to be used in the adjustment of perpendicularity of the wire.

Figure 9:
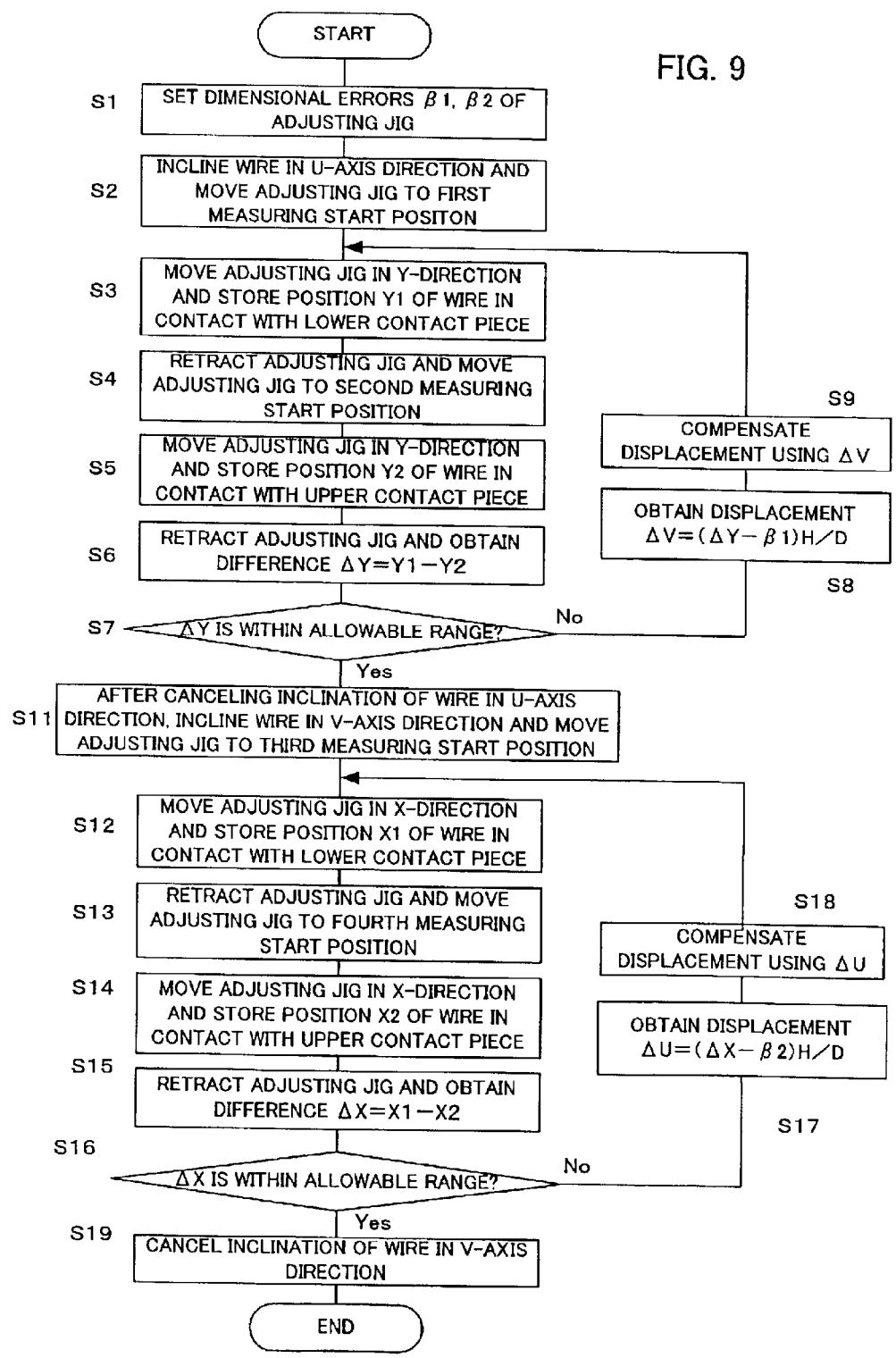
FIG. 9 is a flowchart of processing for adjusting perpendicularity of the wire.

FIG. 9 is a flowchart of processing of adjusting perpendicularity of the wire to be executed by the processor 11 of the numerical controller 10.

First, the dimensional errors β1 and β2 of the adjusting jig 7 are set (Step S1). For the adjustment of perpendicularity of the wire in the Y, V axis direction, the U-axis servomotor Mu is driven to move the upper wire guide 5a by a predetermined amount so that the wire 6 is inclined on the plane parallel to the reference perpendicular plane of the X-Z plane, and the adjusting jig 7 is moved to a first measuring start position where the wire 6 is able to come into contact with only the lower contact piece 8b, as shown in FIG. 3c (Step S2). The Y-axis servomotor My is driven to move the adjusting jig 7 in the Y-axis direction to bring the wire 6 into contact with only the lower contact piece 8b, as shown in FIG. 3a (Step S3). In this Step S3, the Y-axis servomotor My is driven until the determination signal from the comparator 85 of the contact detection circuit 80 turns to the H level, and when the H level signal is detected the driving of the Y-axis servomotor My is stopped and the position Y1 indicative of the contact position of the wire 6 with the contact piece 8b in the Y-axis direction is stored.

Then, the Y-axis servomotor My is driven in the reverse direction to move the adjusting jig 7 apart form the wire 6 and then the X-axis servomotor Mx is driven to move the adjusting jig 7 to a second measuring start position where the wire 6 is able to come into contact with only the upper contact piece Sa, as shown in FIG. 3d (Step S4). Then, the Y-axis servomotor My is driven to move the adjusting jig 7 in the Y-axis direction until the determination signal from the comparator 85 turns to the H level, and when the H level signal is detected the driving of the Y-axis is stopped and the position Y2 indicative of the position of the wire 6 in contact with the contact piece 8a in the Y-axis direction is stored (Step S5).

The Y-axis servomotor My is driven in the reverse direction so that the adjusting jig 7 is apart from the wire 6, and a difference $\Delta Y$ between the position Y1 and the position Y2 is obtained (Step S6). It is determined whether or not the difference $\Delta Y$ is within an allowable range (Step S7). If the difference $\Delta Y$ is not within the allowable range, a displacement amount $\Delta V$ of the upper wire guide 5a in the V-axis direction is obtained according to the equation (2) using the difference $\Delta Y$, the dimensional error $\beta 1$ of the adjusting jig 7, the distance D between the contact pieces 8a and 8b and the distance H between the upper wire guide 5a and the lower wire guide 5b (Step S8). Then, the V-axis servomotor Mv is driven to move the upper wire guide 5a by the displacement $\Delta V$ in the V-axis direction to compensate the displacement o in the V-axis direction (Step S9).

Subsequently, the processing in Steps S3–S9 are repeatedly executed until it is determined that the difference $\Delta Y$ is within the allowable range in Step S7. When it is determined that the displacement $\Delta Y$ is within the allowable range, the procedure of adjusting perpendicularity of the wire in the V-axis direction is completed.

Then, the procedure of adjusting the perpendicularity of the wire guide in the U-axis direction is performed. First, the U-axis servomotor Mu is driven to move the upper wire guide 5a by the predetermined amount in a direction opposite to that in Step S2 to cancel the inclination of the wire 6 in the U-axis direction. Then, for the adjustment of perpendicularity of the wire in the X, U axis direction, the V-axis servomotor Mv is driven to move the upper wire guide 5a in the V-axis direction by a predetermined amount so that the wire 6 is inclined on the plane parallel to a reference perpendicular plane of the Y-Z plane, and the adjusting jig 7 is moved to a third measuring start position where the wire 6 is able to come into contact with only the lower contact piece 8b (Step S11). Then, the procedure of the subsequent Steps S12–S18 equivalent to that in Steps S3–S9 are performed. This procedure is different from the procedure of Steps S3–S9 in that the Y-axis is placed by the X-axis and the displacement amount $\Delta U$ of the upper wire guide 5a in the U-axis direction from the reference perpendicular plane is obtained in place of the displacement amount $\Delta V$ in the V-axis direction.

In particular, the adjusting jig 7 is moved in the X-axis direction until the determination signal from the comparator 85 turns to the H level to bring the wire 6 into contact with the lower contact piece 5b, and positional data X1 of the X axis is stored (Step S12). After the adjusting jig 7 is moved in the X-axis direction so that the lower contact piece 5b is out of contact with the wire 6, the adjusting jig 7 is moved in the Y-axis direction to a fourth measuring start position where the wire 6 is able to come into contact with only the upper contact piece 5a (Step S13). Then, the adjusting jig 7 is moved in the X-axis direction until the determination signal from the comparator 85 turns to the H level to make the wire 6 into contact with the upper contact piece 5a, and position X2 of the X-axis is stored (Step S14).

The X-axis servomotor Mx is driven in the reverse direction so that the adjusting jig 7 is out of contact with the wire 6 and a difference $\Delta X$ between the position X1 and the position X2 is obtained (Step S15). It is determined whether or not the difference $\Delta X$ is within the allowable range (Step S116). If the difference $\Delta X$ is not within the allowable range, a displacement amount $\Delta U$ in the U-axis direction is obtained by arithmetic operation similar to the equation (2) using the difference $\Delta X$, the dimensional error $\beta 2$ of the adjusting jig 7, the distance D between the contact pieces 8a and 8b and the distance H between the upper wire guide 5a and the lower wire guide 5b (Step S17). Then, the U-axis servomotor Mu is driven to move the upper wire guide 5a by the displacement amount $\Delta U$ in the U-axis direction (Step S18).

Subsequently, the processing in Steps S12–S18 are repeatedly executed until it is determined that the difference $\Delta X$ is within the allowable range at Step S16. When it is determined that the difference $\Delta X$ is within the allowable range, the upper wire guide 5a is moved in a direction opposite to that in Step S11 by the predetermined amount to cancel the inclination of the wire 6 in the V-axis direction (Step S19), to terminate the procedure of adjusting the perpendicularity of the wire. In the above Step S7 and the step S16, it is determined whether or not the difference $\Delta Y$ and $\Delta X$ is within the allowable range, respectively. Alternatively, it may be determined whether or not the displacement amount $\Delta V$, $\Delta U$ is within the allowable range in these Steps, respectively.

Figure 10A:
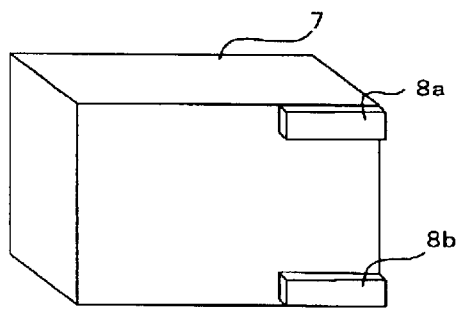
FIGS. 10a–10d are diagrams showing variations of contact pieces of the adjusting jig.
Figure 10B:
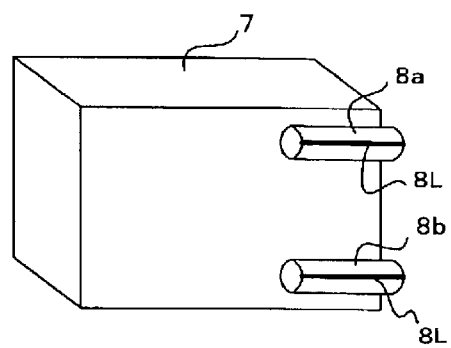
Figure 10C:
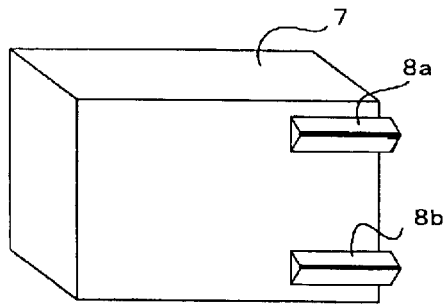

FIGS. 10a–10d shows variations of the contact piece of the adjusting jig 7. Each of the contact piece 8a and 8b shown in FIG. 7a is in the form of a cuboid having planar faces for contact with the wire. A contact piece 8a, 8b shown in FIG. 10b is in the form of a cylinder having a generatrix 8L for contact with the wire. The contact piece 8a, 8b may be in the form of a semi-cylinder or a ridged body having an acuate cross section with a generatrix line parallel to the reference perpendicular plane. The contact piece 8a, 8b shown in FIG. 8c is in the form of a triangular prism having a generatrix for contact with the wire.

Figure 10D:
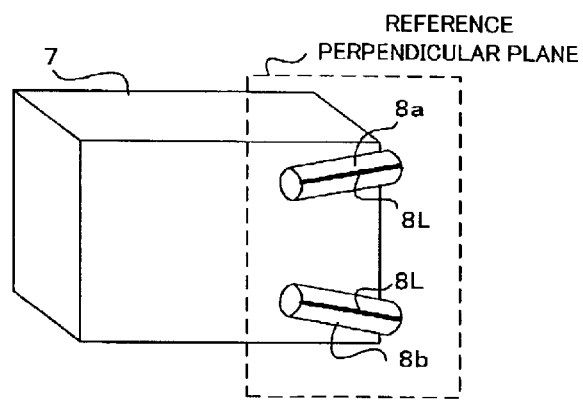

Further, the contact pieces 8a and 8b in the form of cylinders as shown in FIG. 10d are arranged such that the generatrix lines 8L for contact with the wire are not parallel to each other on the reference perpendicular plane. In the case of adopting the contact pieces of this arrangement, the distance D between the upper contact piece 8a and the lower contact piece 8b, which is used in the equations (1) and (2), varies dependent on the contact position with the wire. However, since the adjustment of perpendicularity of the wire is repeatedly executed, as described in the flowchart of FIG. 9, the displacement amount should be converged and it is not necessarily required that the generatrix lines 8L are parallel to each other.

In the above described method of adjusting perpendicularity of the wire, the adjusting jig 7 having the contact pieces is used. An adjusting jig in the form of a cuboid block made of electrically conductive material and having no contacting pieces may be used.

Further, in the case where a workpiece W is a block having portions defining the reference perpendicular plane which can be brought into contact with the wire, such workpiece can be utilized as the adjusting jig for performing the adjustment of perpendicularity of the wire.

Figure 11A:
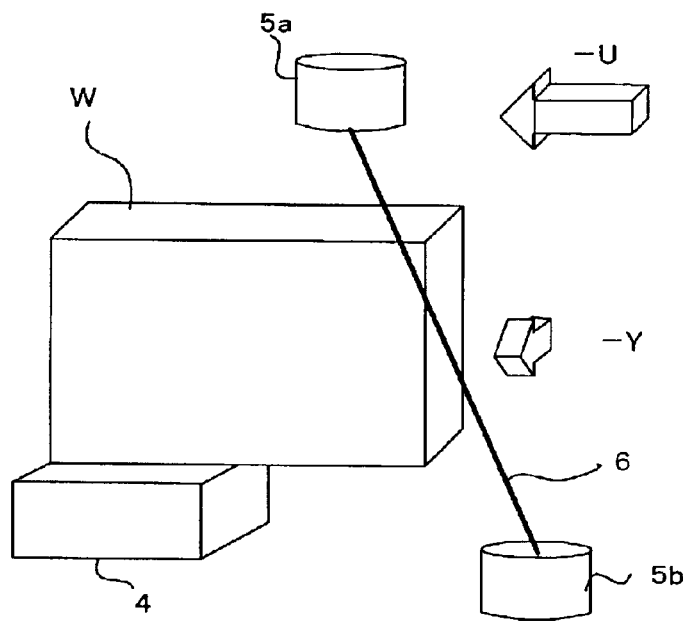
FIGS. 11a and 11b are schematic views illustrating a method of adjusting perpendicularity of the wire using a workpiece as the adjusting jig.

FIG. 11 schematically shows the method of adjusting perpendicularity of the wire using the workpiece W in the form of a cuboid. The workpiece W in the form of a cuboid has a side face defining the reference perpendicular plane when the workpiece W is mounted on the workpiece mounting table 4. The adjustment of perpendicularity of the wire is performed utilizing side lines of a side line of the side face of the workpiece W as a contact line with the wire.

FIG. 11 shows a method of adjusting perpendicularity of the wire in the V-axis direction using the workpiece W.

First, the workpiece W is mounted on the workpiece mounting table 4 such that two side faces of the workpiece W are parallel to the X-Z plane and the Y-Z plane, respectively, to be the reference perpendicular planes. The upper wire guide 5a is moved in the negative direction, in this example, of the V-axis on a plane parallel to the X-Z plane by driving the U-axis servomotor Mu so that the wire 6 is inclined to be able to come into contact with only an upper portion of the workpiece W. The position of the upper wire guide 5a in the U-axis direction in this state is represented by "−U1" The workpiece W is moved in the negative direction of the Y-axis to make the wire 6 into contact with the upper portion of the workpiece W by driving the Y-axis servomotor My, and the positional Y1 on the Y-axis when the wire 6 is in contact with the upper portion of the workpiece W is stored. After the Y-axis servomotor My is driven in the reverse direction to move the workpiece apart from the wire 6, the U-axis servomotor Mu is driven to move the upper wire guide 5a in the positive direction on the U-axis so that the wire 6 is inclined in the reverse direction, and the X-axis servomotor Mx is driven in the negative direction on the X-axis so that the wire 6 is able to come into contact with only a lower portion of the workpiece W. The position in the U-axis direction in this state is represented by "+U2". Then, the Y-axis servomotor is driven to move the workpiece W to make the wire 6 in contact with the lower portion of the workpiece W, and the position Y2 of the Y-axis when the wire 6 is in contact with the lower portion of the workpiece W is stored. Then, the workpiece W is moved to be apart from the wire 6.

If a difference $\Delta Y = Y1 - Y2$ is not within the allowable range, a displacement amount $\Delta V$ is obtained according to the equation (1) using the difference $\Delta Y$, and the displacement of the upper guide 5a in the V-axis direction is compensated based on the displacement amount $\Delta V$. The above procedure is repeatedly performed until the error $\Delta Y$ is within the allowable range.

Figure 11B:
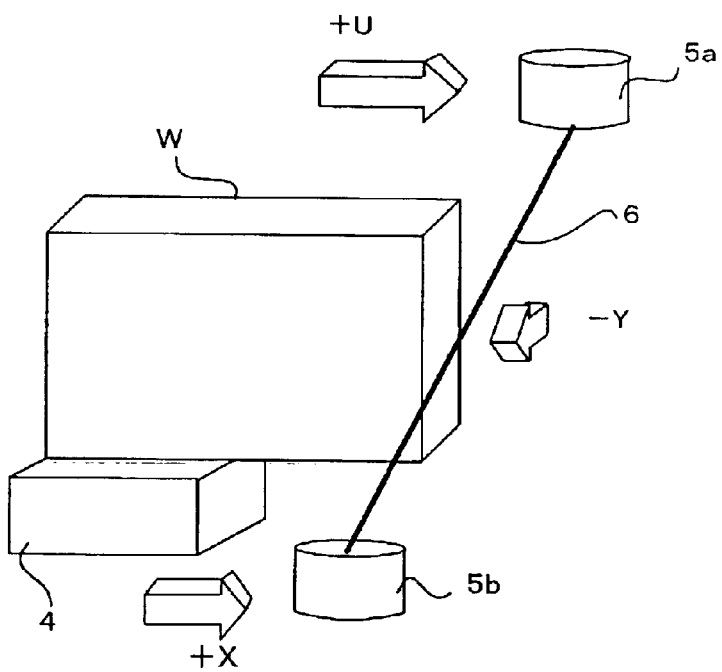

In the above adjustment of perpendicularity of the wire, if the upper guide 5a is displaced in the positive direction on the Y-axis, the wire 6 comes in contact with the horizontal upper peripheral line of the front face of the workpiece W in the state of FIG. 11 a, and the wire 6 comes in contact with the vertical side peripheral line of the workpiece W in the state of in FIG. 11b. Therefore, the distance D between the contact positions in the equation (1) is not the distance between the upper peripheral line and the lower peripheral line of the workpiece W. However, the distance D between the contact points is not changed by setting the positions −U1 and +U2, which determines inclination of the wire, to be constant. If the distance between the upper peripheral line and the lower peripheral line is set as the distance D in the equation (1), precision of the adjustment of the perpendicularity of the wire is not influenced since the compensation of the position of the upper guide 5a is repeatedly executed until the difference $\Delta Y$ is within the allowable range.

In the similar manner, the adjustment of perpendicularity of the wire 6 in the U-axis direction is performed to complete the procedure.

In the above described embodiments, the adjustment of perpendicularity of the wire is described with respect to the vertical-type wire-cut electric discharge machine, and the adjustment of perpendicularity of the wire can be applicable to the horizontal-type wire-cut electric discharge machine.

Further, in the above embodiments, the two reference perpendicular planes are perpendicular to each other. It is not necessarily required that the reference perpendicular planes are perpendicular to each other and any two different reference perpendicular planes may be adopted as the reference vertical planes since there is formed an intersection line perpendicular to the reference plane between the two different reference perpendicular planes.

According to the present invention, since the position of the wire is fixed in the wire guide by inclining the wire and the contact of the wire with the contact piece is detected in this state, the wire is not moved by the contact with the contact piece and thus the contact position is precisely detected, and thereby the perpendicularity of the wire is precisely and easily adjusted.

What is claimed is:

1. A method of adjusting perpendicularity of a wire of a wire-cut electric discharge machine having a driving mechanism for driving a workpiece mounting table in direction of two rectangular axes defining a reference plane, a pair of wire guides for guiding a wire perpendicularly to the reference plane, a driving unit for driving one of the wire guides on a plane parallel to the reference plane, said method comprising the steps of:

(a) arranging an adjusting jig having at least one pair of contact pieces spaced apart from each other on a reference perpendicular plane perpendicular to the reference plane, on said workpiece mounting table;

(b) moving said one of the wire guides so that the wire is inclined in a direction other than a direction perpendicular to the reference perpendicular plane to enable the wire to come into contact with only one of the pair of contact pieces;

(c) moving said adjusting jig so that the wire comes in contact with only said one of the pair of contact pieces and obtaining a first contact position of the wire in contact with said one of the pair of contact pieces;

(d) moving said adjusting jig to enable the wire to come into contact with the other of the pair of the contact pieces;

(e) moving said adjusting jig so that the wire comes into contact with only the other of the pair of contact pieces and obtain a second contact position of the wire in contact with the other of the pair of contact pieces;

(f) obtaining a displacement amount of said one of the wire guides with respect to the reference perpendicular plane based on a difference between the first contact position and the second contact position;

(g) moving said one of the wire guides in a direction to compensate the obtained displacement amount to adjust perpendicularity of the wire on a plane parallel to the reference perpendicular plane;

(h) performing said steps (b)–(g) with respect to another reference perpendicular plane perpendicular to the reference plane to adjust perpendicularity of the wire on a plane parallel to said another reference perpendicular plane.

2. The method according to claim 1, wherein said steps (b)–(g) are repeatedly performed until the difference between the first contact position and the second contact position is not greater than a predetermined value or the displacement amount of said one of the wire guides is not greater than a predetermined amount.

3. The method according to claim 1, wherein the wire is inclined on a plane parallel to the reference perpendicular plane in said step (b).

4. The method according to claim 1, wherein the reference perpendicular plane is parallel to one of said two rectangular axes of said driving mechanism to drive the workpiece mounting table.

5. The method according to claim 1, wherein said driving unit drives said one of the wire guides in two directions respectively parallel to the two rectangular axes of said driving mechanism to drive the workpiece mounting table.

6. The method according to claim 1, wherein each of the contact pieces of said adjusting jig has a portion in a form of a plane, a generatrix line of a cylinder or a semi-cylinder, or a ridge line to contact with the wire, and lines respectively connecting points of contact of the pair of contact pieces with the wire are parallel to each other or extensions of said lines intersect with each other at an acute angle.

7. The method according to claim 1, wherein the contact between the wire and the adjusting jig is detected by a workpiece end face detection circuit to detect a contact between the wire and a workpiece.

8. The method according to claim 1, wherein said adjusting jig is made of an electrically conductive material to equalize electric potential at whole portions thereof.

9. The method according to claim 1, wherein a positional error of the pair of contact pieces of said adjusting jig with respect to the reference perpendicular plane is measured and stored in advance and the displacement amount of said one of the wire guides is compensated using the stored positional error.

10. The method according to claim 1, wherein said adjusting jig is made of an electrically conductive material having corrosion resistance against machining fluid.

11. The method according to claim 1, wherein a block having side faces perpendicular to the reference plane when mounted on said workpiece mounting table is used as said adjusting jig, and an upper portion and a lower portion of said block are used as said pair of contact pieces.

12. A device for adjusting a perpendicularity of a wire of a wire-cut electric discharge machine, comprising:
   a driving mechanism to drive a workpiece mounting table in directions of two rectangular axes defining a reference plane;
   a pair of wire guides to guide a wire perpendicularly to the reference plane, gaps being formed between each of the wire guides and the wire;
   a driving unit to drive one of the wire guides on a plane parallel to the reference plane;
   an adjusting jig arranged on said workpiece mounting table and having at least one pair of contact pieces spaced apart from each other on a reference perpendicular plane perpendicular to the reference plane; and
   an inclination control unit to move said one of the wire guides so that the wire is inclined in a direction other than a direction perpendicular to the reference perpendicular plane to enable the wire to come into contact with only one of the pair of contact pieces, and
   wherein the driving mechanism make the wire come in contact with the pair of contact pieces, respectively, in a state where the wire is inclined to obtain two contact positions of the wire with the pair of contact pieces such that a displacement amount of said one of the wire guides with respect to the reference perpendicular plane based on a difference between the two contact positions is determined which compensates for an error in the perpendicularity caused by at least the gaps between the wire and each of the wire guides.

13. The device according to claim 12, wherein the driving unit moves said one of the wire guides in a direction to compensate for the displacement amount.

14. The device according to claim 13, further comprising:
   means for repeatedly performing processing for obtaining and compensating the displacement amount until the difference between the two contact positions is not greater than a predetermined value or the displacement amount is not greater than a predetermined amount.

15. The device according to claim 12, wherein said inclination control unit makes the wire incline on a plane parallel to the reference perpendicular plane.

16. The device according to claim 12, wherein the reference perpendicular plane is parallel to one of said two rectangular axes of said driving mechanism to drive the workpiece mounting table.

17. The device according to claim 12, wherein said driving unit drives said one of the wire guides in two directions, respectively, parallel to the two rectangular axes of said driving mechanism to drive the workpiece mounting table.

18. The device according to claim 12, wherein each of the contact pieces of said adjusting jig has a portion in a form of a plane, a generatrix line of a cylinder or a semi-cylinder, or a ridge line to contact with the wire and lines respectively connecting points of contact of the pair of contact pieces with the wire are parallel to each other or extensions of said lines intersect with each other at an acute angle.

19. The device according to claim 12, wherein said adjusting jig is made of an electrically conductive material to equalize electric potential at whole portions thereof.

20. The device according to claim 12, further comprising:
   a storage unit to store a positional error of the pair of contact pieces of said adjusting jig with respect to the reference perpendicular plane and to compensate for the displacement amount of said one of the wire guides using the stored positional error.

21. The device according to claim 12, wherein said adjusting jig is made of an electrically conductive material having corrosion resistance against machining fluid.

22. A method of adjusting a perpendicularity of a wire of a wire cut electric discharge machine having a driving mechanism to drive a workpiece mounting table in two directions of rectangular axes defining a reference plane, a pair of wire guides to guide a wire perpendicularly to the reference plane, a driving unit to drive one of the wire guides on a plane parallel to the reference plane, said method comprising:
   arranging an adjusting jig on said workpiece mounting table, the adjusting jig having at least one pair of contact pieces spaced apart from each other on a reference perpendicular plane perpendicular to the reference plane,
   moving said one of the wire guides so that the wire is inclined in a direction other than a direction perpendicular to the reference perpendicular plane to enable the wire to come into contact with only one of the pair of contact pieces;
   moving said adjusting jig so that the wire comes in contact with only said one of the pair of contact pieces and obtaining a first contact position of the wire in contact with said one of the pair of contact pieces;

moving said adjusting jig to enable the wire to come into contact with a remaining one of the pair of the contact pieces;

moving said adjusting jig so that the wire comes into contact with only the remaining one of the pair of contact pieces and obtaining a second contact position of the wire in contact with the remaining one of the pair of contact pieces;

determining a displacement amount of said one of the wire guides with respect to the reference perpendicular plane in accordance with the first and second contact positions;

moving said one of the wire guides in a direction to compensate for the displacement amount according to a result of the determining to adjust perpendicularity of the wire on a plane parallel to the reference perpendicular plane; and repeatedly performing said moving and determining operations with respect to further planes perpendicular to the reference plane to adjust perpendicularity of the wire on a plane parallel to said further reference perpendicular plane.

23. The method according to claim 22, wherein said repeatedly performing is repeatedly performed until a difference between the first and second contact positions is less than or equal to a predetermined value or the displacement amount of said one of the wire guides is less than or equal to a predetermined amount.

* * * * *

UNITED STATES PATENT AND TRADEMARK OFFICE
CERTIFICATE OF CORRECTION

PATENT NO. : 6,747,237 B2
DATED : June 8, 2004
INVENTOR(S) : Yasuo Arakawa

It is certified that error appears in the above-identified patent and that said Letters Patent is hereby corrected as shown below:

Title page,
Item [57], ABSTRACT, please delete entire ABSTRACT, and replace with the following:

-- A method of and a device for adjusting perpendicularity of a wire of a wire-cut electric discharge machine for performing a precise electric discharge machining with low cost. The wire is inclined in a U-axis direction to enable the wire to come into contact with only a lower contact piece of an adjusting jig. The wire is held at fixed positions with no play at an upper wire guide and the lower wire guide in this inclined state. The adjusting jig is moved in the Y-axis direction to bring the wire into contact with only the lower wire guide and a position Y1 of the contact is stored. The adjusting jig is moved in the X-axis direction to enable the wire to come into contact with only the upper contact piece, and the adjusting jig is moved in the Y-axis direction to bring the wire into contact with the upper wire guide and a position Y2 of the contact is stored. A displacement of the upper wire guide in the V-axis direction is obtained based on a difference $\Delta Y$ between the contact positions Y1 and Y2 and a distance D between the two contact pieces and a difference H between the upper and the lower wire guides, to compensate the displacement of the upper guide according to the displacement amount. The above procedure is repeatedly performed until the difference $\Delta Y$ is within an allowable range. An adjustment of perpendicularity of the wire in the U-axis direction is performed in the similar manner. --

Column 1,
Line 57, change "heft-hand" to -- left-hand --

Column 3,
Line 49, change "wit" to -- with --

Column 9,
Line 10, change "form" to -- from --
Line 14, change "Sa" to -- 5a --

Column 10,
Line 15, change "S116" to -- S16 --

Column 11,
Line 57, change "11 a" to -- 11a --

UNITED STATES PATENT AND TRADEMARK OFFICE
CERTIFICATE OF CORRECTION

PATENT NO. : 6,747,237 B2
DATED : June 8, 2004
INVENTOR(S) : Yasuo Arakawa

It is certified that error appears in the above-identified patent and that said Letters Patent is hereby corrected as shown below:

Column 13,
Line 66, change "make" to -- makes --

Signed and Sealed this

Fourth Day of January, 2005

JON W. DUDAS
*Director of the United States Patent and Trademark Office*